US011400767B2

(12) United States Patent
Okabe et al.

(10) Patent No.: US 11,400,767 B2
(45) Date of Patent: Aug. 2, 2022

(54) HEAVY DUTY PNEUMATIC TIRE

(71) Applicant: Sumitomo Rubber Industries, Ltd., Kobe (JP)

(72) Inventors: Taro Okabe, Kobe (JP); Satoshi Tanaka, Kobe (JP); Yasushi Shinmura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 154 days.

(21) Appl. No.: 16/659,295

(22) Filed: Oct. 21, 2019

(65) Prior Publication Data

US 2020/0122524 A1    Apr. 23, 2020

(30) Foreign Application Priority Data

Oct. 22, 2018    (JP) .............................. JP2018-198180

(51) Int. Cl.
*B60C 15/06* (2006.01)
*B60C 13/02* (2006.01)

(52) U.S. Cl.
CPC .......... *B60C 15/0607* (2013.01); *B60C 13/02* (2013.01); *B60C 15/0628* (2013.01); *B60C 15/0635* (2013.01); *B60C 2015/061* (2013.01); *B60C 2200/06* (2013.01)

(58) Field of Classification Search
CPC . B60C 15/0607; B60C 13/02; B60C 15/0628; B60C 15/0635; B60C 2015/061; B60C 2200/06; B60C 2015/065; B60C 15/024; B60C 15/06; B60C 13/023; B60C 15/0603; B60C 2015/0614;
(Continued)

(56) References Cited

U.S. PATENT DOCUMENTS 5,332,016 A * 7/1994 Tsuruta ................... B60C 13/00
                                                    152/523
6,129,128 A * 10/2000 Fukumoto ............... B60C 15/06
                                                    152/539
(Continued)

FOREIGN PATENT DOCUMENTS

EP    1669219    *  6/2006
EP    3132949 A1 *  2/2017    ........... B60C 15/024
(Continued)

OTHER PUBLICATIONS

Miyazaki, JP-10044724-A Machine Translation (Year: 1998).*
(Continued)

*Primary Examiner* — Justin R Fischer
(74) *Attorney, Agent, or Firm* — Birch, Stewart, Kolasch & Birch, LLP (57) ABSTRACT

A tire 32 includes: a pair of beads 40; a carcass ply 82 having a ply main body 84 and turned-up portions 86; and a pair of fillers 52 that are located outward of the turned-up portions 86 in the axial direction and that include metal cords. In a radial direction, a first end 92 of each filler 52 is located inward of a bead base line, and a second end 94 of each filler 52 is located between an end 88 of the turned-up portion 86 and the bead base line. A recess 96 is provided on a zone of each side surface 34 of the tire 32 between a maximum width position and the end 88 of the turned-up portion 86.

20 Claims, 5 Drawing Sheets

(58) Field of Classification Search
CPC ...... B60C 2015/0617; B60C 2015/621; B60C 2015/0625
See application file for complete search history.

(56) References Cited

U.S. PATENT DOCUMENTS

| | | | | |
|---|---|---|---|---|
| 6,269,856 | B1* | 8/2001 | Ueyoko | ............ B60C 3/04 |
| | | | | 152/454 |
| 8,763,664 | B2* | 7/2014 | De-Tullio | ........... B60C 15/06 |
| | | | | 152/543 |
| 2005/0045260 | A1* | 3/2005 | Maruoka | ......... B60C 15/0027 |
| | | | | 152/554 |
| 2010/0269968 | A1* | 10/2010 | Kurita | ........... B60C 15/0027 |
| | | | | 152/454 |
| 2015/0239300 | A1 | 8/2015 | Okabe | |
| 2017/0008351 | A1* | 1/2017 | Kodama | ........... B60C 15/024 |

FOREIGN PATENT DOCUMENTS

| | | | | |
|---|---|---|---|---|
| GB | 1210935 | * | 11/1970 | |
| JP | 06032122 | A * | 2/1994 | |
| JP | 10044724 | A * | 2/1998 | ............ B60C 15/06 |
| JP | 2000158919 | A * | 6/2000 | |
| JP | 2000185530 | A * | 7/2000 | |
| JP | 2003-136922 | A | 5/2003 | |
| JP | 2005-313735 | A | 11/2005 | |
| JP | 2014-237353 | * | 12/2014 | |
| JP | 2015-157524 | A | 9/2015 | |
| JP | 2017043281 | A * | 3/2017 | |
| JP | 2018-1806 | * | 1/2018 | |

OTHER PUBLICATIONS

Iida, JP-06032122-A Machine Translation (Year: 1994).*
Tanada, JP-2017043281-A Machine Translation (Year: 2017).*
Hokushu, JP-2000185530-A Machine Translation (Year: 2000).*
Endo, JP-2000158919-A Machine Translation (Year: 2000).*

* cited by examiner

PRIOR ART

HEAVY DUTY PNEUMATIC TIRE

The present application is based upon and claims the benefit of priority to Japanese Patent Application No. 2018-198180, filed Oct. 22, 2018, the entire contents of which are incorporated herein by reference.

TECHNICAL FIELD

The present invention relates to heavy duty pneumatic tires.

BACKGROUND ART

Figure 5:
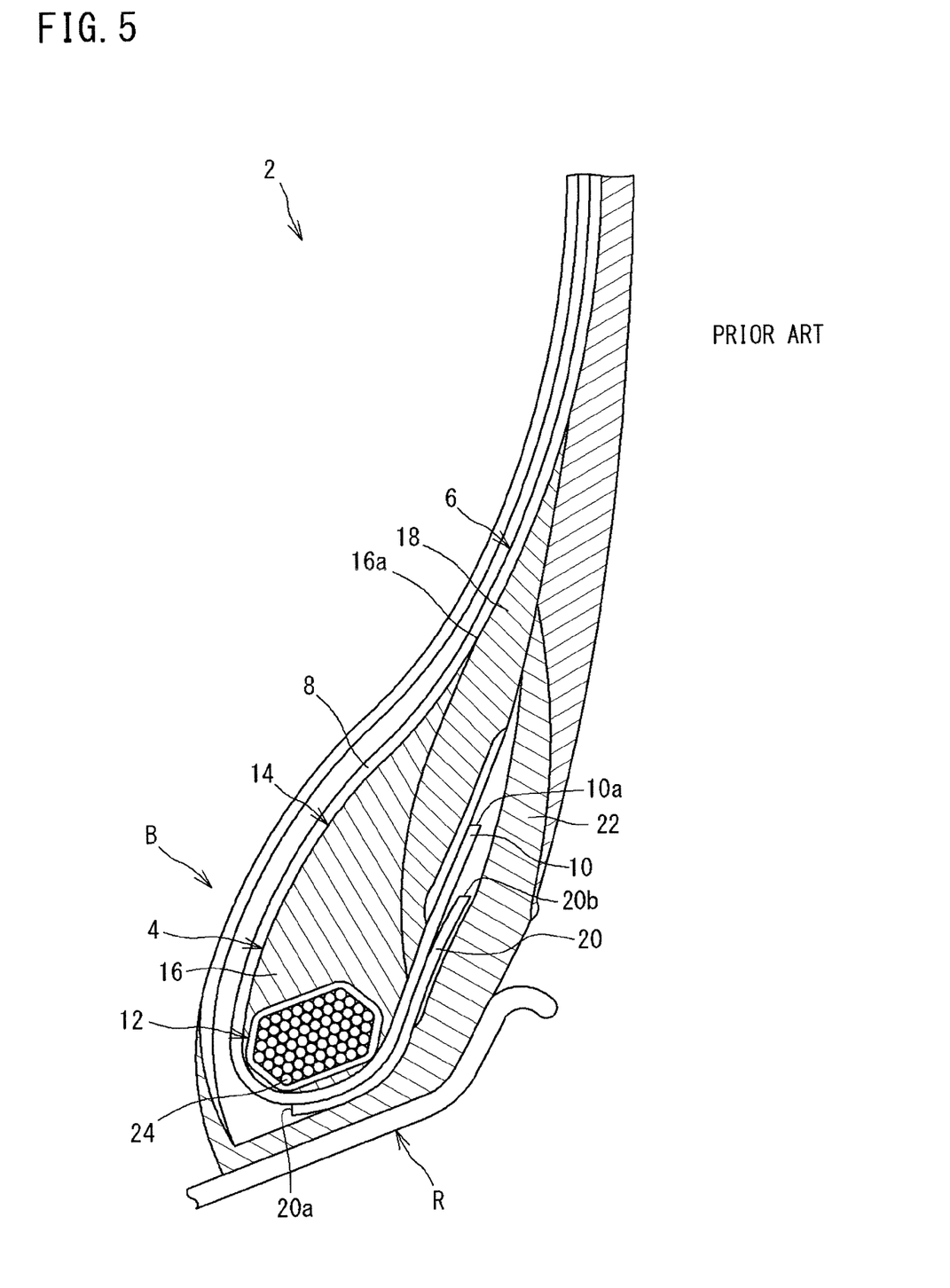
FIG. 5 is a partial cross-sectional view of a bead portion of a conventional heavy duty pneumatic tire.

FIG. 5 shows a bead 4 portion (hereinafter, also referred to as a bead portion B) of a conventional heavy duty pneumatic tire 2. The bead portion B is fitted to a rim R (normal rim).

In the tire 2, a carcass ply 6 is turned around the bead 4 up from the inner side toward the outer side in the axial direction. The carcass ply 6 includes a ply main body 8 and a turned-up portion 10.

In the tire 2, the bead 4 includes a core 12 and an apex 14. In the tire 2, the apex 14 includes a first apex 16 and a second apex 18 that is more flexible than the first apex 16. As shown in FIG. 5, an outer end 16a of the first apex 16 is located outward of an end 10a of the turned-up portion 10 in the radial direction.

To ensure that the bead portion B has desired stiffness, the tire 2 includes a filler 20. The filler 20 includes a large number of steel cords aligned with each other, and a topping rubber, which are not shown.

The filler 20 is located between the turned-up portion 10 and a chafer 22. As shown in FIG. 5, an inner end 20a of the filler 20 is located inward of the core 12 of the bead 4 in the radial direction. An outer end 20b of the filler 20 is located inward of the end 10a of the turned-up portion 10. Unlike a conventional filler (hereinafter, also referred to as a normal filler), the filler 20 does not have a structure in which the filler 20 is turned up around the bead 4. The filler 20 is also referred to as a short filler.

The tire 2 is mounted to a vehicle such as a truck and a bus. A large load is applied to the bead portion B of the tire 2. Thus, it is important to improve the durability of the bead portion B, that is, bead durability. For heavy duty pneumatic tires, improving the bead durability by adjusting the configuration of the bead portion B and controlling the stiffness of the bead portion B is considered (for example, Japanese Laid-Open Patent Publication No. 2015-157524).

SUMMARY OF INVENTION

Technical Problem

In the tire 2 in which the above-described short filler is used as the filler 20, force applied to the ply main body 8 that is protected in a tire in which a normal filler is used and that extends radially outward along the bead 4 from the position of the inner end 20a of the filler 20, increases. In the tire 2, the holding force for the bead 4 by the filler 20 decreases, and thus movement of the bead portion B is large. Therefore, movement of the end 10a of the turned-up portion 10 is also large, so that there is a concern that damage called ply turn-up loose (PTL) may occur. The movement of the bead portion B causes heat generation, that is, energy loss, and thus an increase in rolling resistance may also be caused. An increase in the rolling resistance of the tire 2 affects the fuel economy of a vehicle.

If the stiffness of the bead portion B is improved, for example, by increasing the number of turns of a wire 24 in a core 12 that is formed by winding the wire 24, or increasing the volume of the apex 14 located radially outward of the core 12, the bead durability can be improved. However, the weight of the tire 2 increases, and there is also a concern that heat generation, that is, energy loss, caused by movement of the bead portion B, may be increased.

The present invention has been made in view of the above circumstances, and an object of the present invention is to provide a heavy duty pneumatic tire in which improvement of bead durability and reduction of rolling resistance are achieved while weight reduction is achieved.

Solution to Problem

A heavy duty pneumatic tire according to an aspect of the present invention includes: a pair of beads; a carcass ply having a ply main body that extends on and between one bead and the other bead, and turned-up portions that are connected to the ply main body and turned around the beads from an inner side toward an outer side in an axial direction; and a pair of fillers that are located outward of the turned-up portions in the axial direction and that include metal cords. In a radial direction, a first end of each filler is located inward of a bead base line, and a second end of each filler is located between an end of the turned-up portion and the bead base line. A recess is provided on a zone of each side surface of the tire between a maximum width position and the end of the turned-up portion.

Preferably, in the heavy duty pneumatic tire, a ratio of a minimum thickness from the ply main body to the recess relative to a virtual thickness, from the ply main body to a virtual side surface obtained on the assumption that the recess is not present, measured along a line segment indicating the minimum thickness is not less than 0.3 and not greater than 0.7.

Preferably, in the heavy duty pneumatic tire, a minimum thickness position of the recess is located outward of a center position of the recess in the radial direction.

Preferably, in the heavy duty pneumatic tire, a distance in the radial direction from the end of the turned-up portion to an inner end of the recess is not less than 10 mm and not greater than 20 mm.

Preferably, in the heavy duty pneumatic tire, a distance in the radial direction from the maximum width position to an outer end of the recess is not less than 10 mm and not greater than 20 mm.

Preferably, in the heavy duty pneumatic tire, the recess includes a bottom portion, an outer boundary portion located outward of the bottom portion in the radial direction, and an inner boundary portion located inward of the bottom portion in the radial direction. A profile of the outer boundary portion is represented by a circular arc that projects outward, and a profile of the inner boundary portion is represented by a circular arc that projects outward.

Preferably, in the heavy duty pneumatic tire, the circular arc that represents the profile of the outer boundary portion and that projects outward has a radius not less than 40 mm.

Preferably, in the heavy duty pneumatic tire, the circular arc that represents the profile of the inner boundary portion and that projects outward has a radius not less than 40 mm.

Preferably, in the heavy duty pneumatic tire, a profile of the bottom portion is represented by a circular arc that projects inward.

Preferably, in the heavy duty pneumatic tire, a profile of the bottom portion is represented by a straight line.

Preferably, in the heavy duty pneumatic tire, a ratio of a distance in the radial direction from an inner end of the recess to an outer end of the recess relative to a distance in the radial direction from the bead base line to the maximum width position is not less than 0.45 and not greater than 0.65.

Preferably, in the heavy duty pneumatic tire, each bead includes a core, a first apex that surrounds the core, and a second apex that is located outward of the first apex in a radial direction. An outer periphery of the first apex has a rounded contour. The first apex is harder than the second apex.

Preferably, in the heavy duty pneumatic tire, in the radial direction, an outer end of the first apex is located outward of a position, on the side surface, corresponding to a radially outer end of a contact surface between the tire and a flange of a rim.

Preferably, in the heavy duty pneumatic tire, a distance in the radial direction from a radially inner end of the core to an outer end of the first apex is not less than 15 mm and not greater than 45 mm.

Preferably, in the heavy duty pneumatic tire, a distance from an axially inner end of the core to the carcass ply is not less than 1 mm and not greater than 5 mm.

Advantageous Effects of Invention

In the heavy duty pneumatic tire of the present invention, improvement of bead durability and reduction of rolling resistance are achieved while weight reduction is achieved.

DESCRIPTION OF EMBODIMENTS

The following will describe in detail the present invention based on preferred embodiments with appropriate reference to the drawings.

In the present invention, a state where a tire is mounted on a normal rim, the internal pressure of the tire is adjusted to a normal internal pressure, and no load is applied to the tire is referred to as a normal state. In the present invention, unless otherwise specified, the dimensions and angles of each component of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
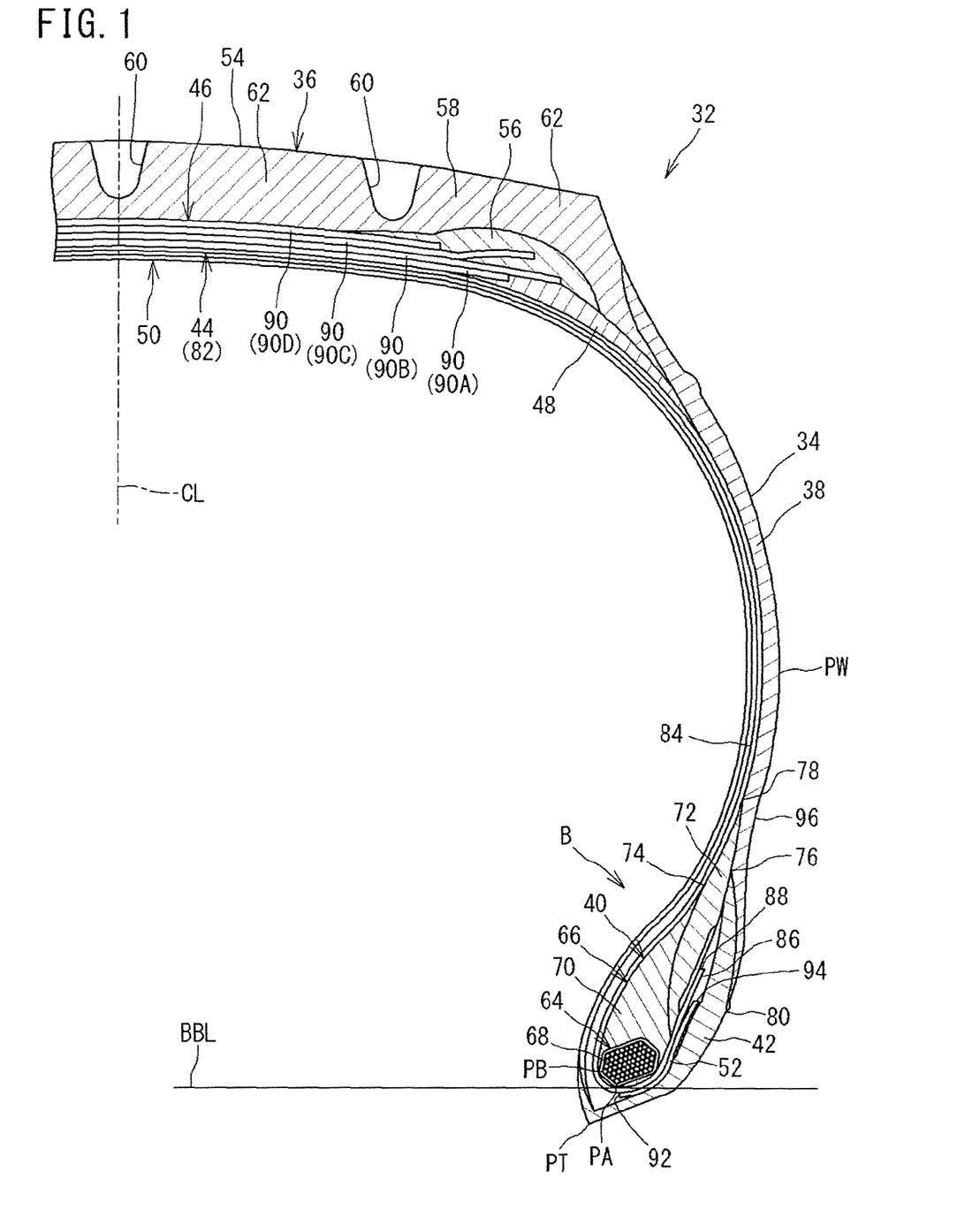
FIG. 1 is a cross-sectional view of a part of a heavy duty pneumatic tire according to an embodiment of the present invention.

FIG. 1 shows a part of a heavy duty pneumatic tire 32 (hereinafter, simply referred to as "tire 32") according to an embodiment of the present invention. The tire 32 is mounted to a heavy duty vehicle such as a truck and a bus.

FIG. 1 shows a part of a cross-section of the tire 32 along a plane including the rotation axis of the tire 32. In FIG. 1, the right-left direction is the axial direction of the tire 32, and the up-down direction is the radial direction of the tire 32. The direction perpendicular to the surface of the sheet of FIG. 1 is the circumferential direction of the tire 32. In FIG. 1, an alternate long and short dash line CL represents the equator plane of the tire 32.

In FIG. 1, a solid line BBL extending in the axial direction is a bead base line. The bead base line BBL is a line that defines the rim diameter (see JATMA or the like) of a rim (normal rim).

In FIG. 1, reference character PW represents an axially outer end of the tire 32. The outer end PW is specified on the basis of a virtual side surface obtained on the assumption that decorations such as patterns and letters are not present on a side surface 34 of the tire 32. The distance in the axial direction from one outer end PW to the other outer end PW is the maximum width of the tire 32, that is, the cross-sectional width (see JATMA or the like) of the tire 32. The outer end PW is a position at which the tire 32 has the maximum width (hereinafter, also referred to as a maximum width position of the tire 32).

The tire 32 includes a tread 36, a pair of sidewalls 38, a pair of beads 40, a pair of chafers 42, a carcass 44, a belt 46, a pair of cushion layers 48, an inner liner 50, and a pair of fillers 52.

An outer surface 54 of the tread 36 comes into contact with a road surface. The outer surface 54 of the tread 36 is a tread surface. The above-described side surface 34 is connected to an end of the tread surface 54 and extends radially inward.

In the tire 32, the tread 36 includes a base portion 56 and a cap portion 58. In the tire 32, a pair of base portions 56 are provided. These base portions 56 are disposed at an interval in the axial direction. Each base portion 56 covers an end portion of the belt 46. The base portion 56 is formed from a crosslinked rubber. The cap portion 58 is located radially outward of each base portion 56. The cap portion 58 covers the pair of base portions 56 and the entirety of the belt 46. The outer surface of the cap portion 58 forms the above-described tread surface 54. The cap portion 58 is formed from a crosslinked rubber.

In the tire 32, at least three circumferential grooves 60 are formed on the tread 36. Accordingly, in the tread 36, at least four circumferential land portions 62 are formed.

Each sidewall 38 is connected to an end of the tread 36. The sidewall 38 extends radially inward from the end of the tread 36. The sidewall 38 is formed from a crosslinked rubber. The outer surface of the sidewall 38 forms the side surface 34 of the tire 32.

Each bead 40 is located radially inward of the sidewall 38. The bead 40 includes a core 64 and an apex 66.

The core 64 extends in the circumferential direction. The core 64 includes a wound wire 68 made of steel. The core 64 has a substantially hexagonal cross-sectional shape. In the tire 32, the core 64 is located outward of the bead base line BBL in the radial direction. In the cross-section of the core 64, a corner portion indicated by reference character PA is the radially inner end of the core 64, and a corner portion indicated by reference character PB is the axially inner end of the core 64. Each corner portion of the core 64 is specified on the basis of the contour of a cross-section bundle of the wire 68 included in the cross-section of the core 64.

The apex 66 is located radially outward of the core 64. The apex 66 extends radially outward from the core 64. In the tire 32, the apex 66 includes a first apex 70 and a second apex 72. The first apex 70 is located radially outward of the core 64. The first apex 70 is tapered outward in the radial direction. The second apex 72 is located axially outward of the first apex 70. The second apex 72 has a large thickness at a portion at which an outer end 74 of the first apex 70 is located. An outer portion of the second apex 72 is tapered outward in the radial direction. An inner portion of the second apex 72 is tapered inward in the radial direction. Each of the first apex 70 and the second apex 72 is formed from a crosslinked rubber. The first apex 70 is harder than the second apex 72. The apex 66 is composed of the hard first apex 70 and the flexible second apex 72.

In the tire 32, the hardness of the first apex 70 is set to be not less than 83 and not greater than 98. The hardness of the second apex 72 is set to be not less than 45 and not greater than 65. In the present invention, the "hardness" is measured according to JIS K6253 under a temperature condition of 23° C. using a type A durometer.

Each chafer 42 is located axially outward of the bead 40. The chafer 42 is located radially inward of the sidewall 38. Although not shown, the chafer 42 comes into contact with a rim. The chafer 42 is formed from a crosslinked rubber. In the tire 32, an outer end 76 of the chafer 42 is located inward of an outer end 78 of the second apex 72, that is, an outer end 78 of the apex 66, in the radial direction.

In FIG. 1, reference character PT represents a toe of the tire 32. The outer surface of the chafer 42 from the toe PT to an inner end 80 of the sidewall 38 forms a part of the side surface 34.

The carcass 44 is located inward of the tread 36, each sidewall 38, and each chafer 42. The carcass 44 includes at least one carcass ply 82. The carcass 44 of the tire 32 is composed of one carcass ply 82.

The carcass ply 82 includes a large number of carcass cords aligned with each other, which are not shown. The carcass cords are covered with a topping rubber. Each carcass cord intersects the equator plane CL. In the tire 32, the angle of each carcass cord relative to the equator plane CL is not less than 70° and not greater than 90°. The carcass 44 of the tire 32 has a radial structure. In the tire 32, the material of the carcass cords is steel. A cord formed from an organic fiber may be used as each carcass cord.

In the tire 32, the carcass ply 82 is turned up around each bead 40 (specifically, each core 64) from the inner side toward the outer side in the axial direction. The carcass ply 82 has: a ply main body 84 that extends on and between one bead 40 and the other bead 40; and a pair of turned-up portions 86 that are connected to the ply main body 84 and turned up around the respective beads 40 from the inner side toward the outer side in the axial direction. In the tire 32, an end 88 of each turned-up portion 86 is located inward of the outer end 74 of the first apex 70 in the radial direction.

The belt 46 is located radially inward of the tread 36. The belt 46 is located radially outward of the carcass 44.

In the tire 32, the belt 46 includes four layers 90 layered in the radial direction. In the tire 32, the number of layers 90 forming the belt 46 is not particularly limited. The configuration of the belt 46 is determined as appropriate in consideration of the specifications of the tire 32.

Each layer 90 includes a large number of belt cords aligned with each other, which are not shown. These belt cords are covered with a topping rubber. In the tire 32, the material of the belt cords is steel.

In each layer 90, each belt cord is tilted relative to the equator plane CL. The belt cords in one layer 90 intersect the belt cords in another layer 90 layered on the one layer 90.

In the tire 32, among the four layers 90, a second layer 90B located between a first layer 90A and a third layer 90C has the maximum width in the axial direction. A fourth layer 90D located at the outermost side in the radial direction has the minimum width in the axial direction.

Each cushion layer 48 is located between the belt 46 and the carcass 44 at an end portion of the belt 46. The cushion layer 48 is formed from a crosslinked rubber.

The inner liner 50 is located inward of the carcass 44. The inner liner 50 foul's the inner surface of the tire 32. The inner liner 50 is formed from a crosslinked rubber that has an excellent air blocking property. The inner liner 50 maintains the internal pressure of the tire 32.

Each filler 52 is located at a bead 40 portion. The filler 52 is located outward of the bead 40 in the axial direction. As shown in FIG. 1, the filler 52 is located between the turned-up portion 86 and the chafer 42.

The filler 52 includes a large number of metal cords aligned with each other, which are not shown. In the tire 32, the material of the metal cords is steel. In the tire 32, the metal cords included in the filler 52 are steel cords. In the filler 52, the metal cords are covered with a topping rubber.

In the tire 32, in the radial direction, a first end 92 (also referred to as an inner end) of the filler 52 is located inward of the bead base line BBL. The first end 92 of the filler 52 is located between the bead base line BBL and the toe PT in the radial direction. In the tire 32, in the axial direction, the first end 92 of the filler 52 is disposed at a position that coincides with the position of the inner end PA of the core 64, that is, the position of the corner portion PA. A second end 94 (also referred to as an outer end) of the filler 52 is located inward of the end 88 of the turned-up portion 86 in the radial direction. The second end 94 of the filler 52 is located between the end 88 of the turned-up portion 86 and the bead base line BBL in the radial direction. The filler 52 is a short filler.

Figure 2:
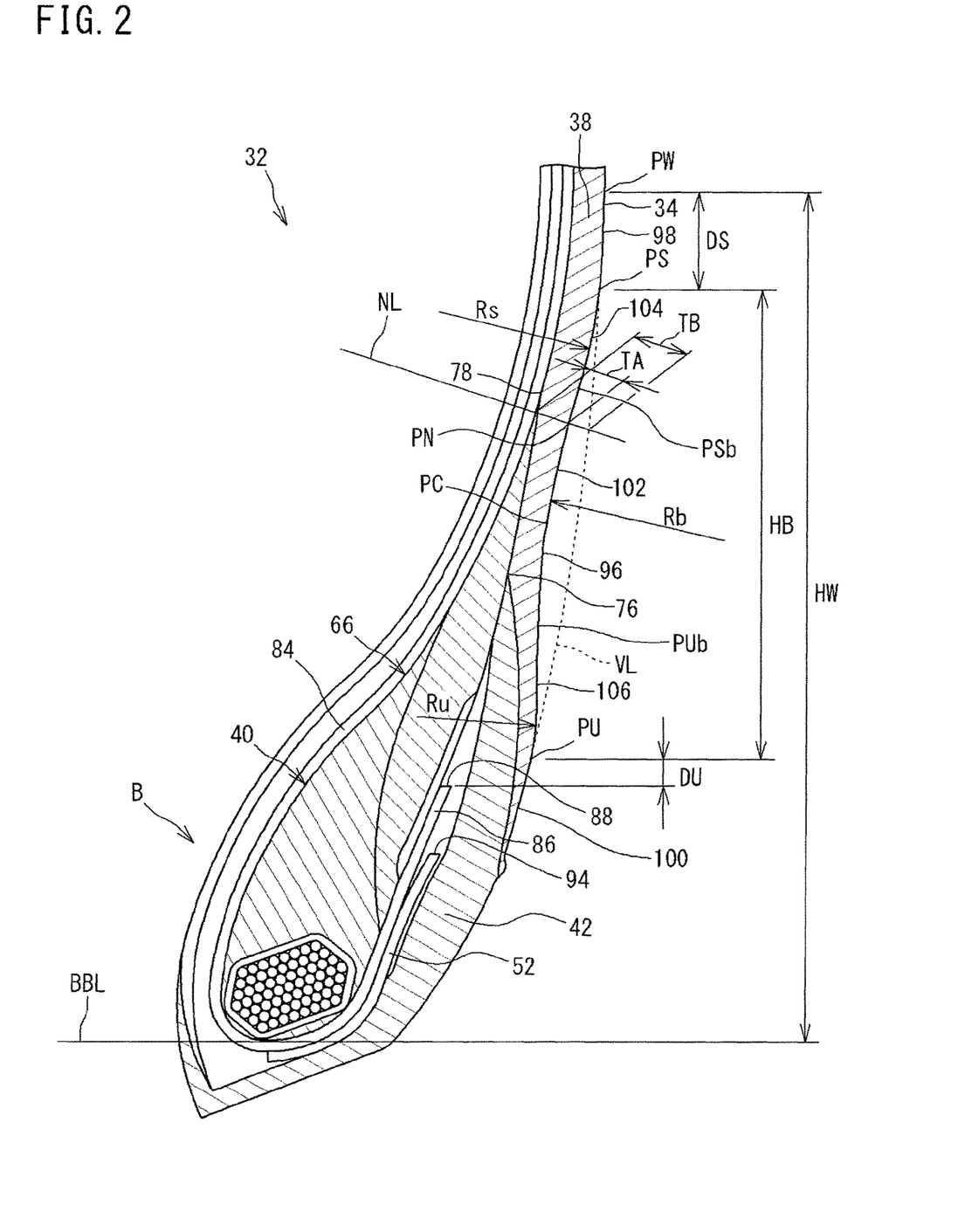
FIG. 2 is a partial cross-sectional view of a bead portion of the tire in FIG. 1.

FIG. 2 shows a part of the cross-section of the tire 32 shown in FIG. 1. In FIG. 2, a bead 40 portion (hereinafter, also referred to as "bead portion B") of the tire 32 is shown. In FIG. 2, the right-left direction is the axial direction of the tire 32, and the up-down direction is the radial direction of the tire 32. The direction perpendicular to the surface of the sheet of FIG. 2 is the circumferential direction of the tire 32.

In the tire 32, a recess 96 is provided on the side surface 34. In the tire 32, the recess 96 is provided on the outer surface of the sidewall 38 which forms a part of the side surface 34. As shown in FIG. 2, the recess 96 has a shape that projects inward. The recess 96 extends in the circumferential direction without interruption.

In FIG. 2, reference character PS represents an outer end of the recess 96. Reference character PU represents an inner end of the recess 96. In the tire 32, in the radial direction, the outer end PS of the recess 96 is located inward of the maximum width position PW. The inner end PU of the recess 96 is located outward of the end 88 of the turned-up portion 86 in the radial direction. In the tire 32, the recess 96 is provided on a zone of the side surface 34 between the maximum width position PW and the end 88 of the turned-up portion 86.

When a load is applied to the tire 32 that is mounted on a rim, the rubber moves toward the vicinity in which the end 88 of the turned-up portion 86 and the second end 94 of the filler 52 are located, in the tire 32. In accordance with this movement, the ply main body 84 moves axially outward. As described above, in the tire 32, the recess 96 is located on the zone between the maximum width position PW and the end 88 of the turned-up portion 86. The recess 96 inhibits movement of the rubber in the vicinity in which the end 88 of the turned-up portion 86 and the second end 94 of the filler 52 are located, and also inhibits movement of the ply main body 84. The recess 96 inhibits movement of the rubber at a portion radially outward of the end 88 of the turned-up portion 86 when a load is applied to the tire 32.

In the tire 32, a short filler is used as each filler 52. The filler 52 contributes to weight reduction. In addition, as described above, the recess 96, which is provided on the zone of the side surface 34 between the maximum width position PW and the end 88 of the turned-up portion 86, inhibits movement of the rubber at the portion radially outward of the end 88 of the turned-up portion 86. Since movement of the turned-up portion 86 is inhibited, damage such as ply turn-up loose is less likely to occur in the tire 32. Furthermore, this movement inhibition also inhibits heat generation caused by deformation. In addition, the recess 96 also contributes to weight reduction. In the tire 32, improvement of bead durability and reduction of rolling resistance are achieved while weight reduction is achieved.

In FIG. 2, a dotted line VL represents a virtual side surface obtained on the assumption that the recess 96 is not present on the side surface 34. The virtual side surface VL is a part of the above-described virtual side surface used for specifying the maximum width position PW. A solid line NL represents a line normal to the ply main body 84. A double-headed arrow TA represents a thickness, from the ply main body 84 to the recess 96, measured along the normal line NL. In the tire 32, the thickness TA is represented as the minimum thickness from the ply main body 84 to the recess 96. A double-headed arrow TB represents a virtual thickness, from the ply main body 84 to the virtual side surface VL, measured along a line segment indicating the minimum thickness TA, that is, along the normal line NL.

In the tire 32, the ratio of the minimum thickness TA to the virtual thickness TB is preferably not less than 0.3 and preferably not greater than 0.7. When this ratio is set to be not less than 0.3, an increase in strain near the bottom of the recess 96 is inhibited, and the minimum thickness TA becomes a necessary thickness. In the tire 32, occurrence of damage such as a crack at the recess 96 is inhibited. From this viewpoint, this ratio is more preferably not less than 0.4. When this ratio is set to be not greater than 0.7, movement of the rubber forming the sidewall 38 toward the rim flange side when a load is applied is inhibited. In the tire 32, the recess 96 effectively inhibits movement of the rubber at the portion radially outward of the end 88 of the turned-up portion 86. In the tire 32, the bead durability is effectively improved, and the rolling resistance is effectively reduced. From this viewpoint, this ratio is preferably not greater than 0.6.

In FIG. 2, a double-headed arrow DU represents the distance in the radial direction from the end 88 of the turned-up portion 86 to the inner end PU of the recess 96. A double-headed arrow DS represents the distance in the radial direction from the maximum width position PW to the outer end PS of the recess 96.

In the tire 32, the distance DU in the radial direction from the end 88 of the turned-up portion 86 to the inner end PU of the recess 96 is preferably not less than 10 mm and preferably not greater than 20 mm. When the distance DU is set to be not less than 10 mm, the recess 96 is located at an appropriate interval from the end 88 of the turned-up portion 86, and thus interference between the recess 96 and the turned-up portion 86 is prevented. Since concentration of strain on the end 88 of the turned-up portion 86 is inhibited and the effect achieved by the recess 96 is sufficiently exhibited, the bead durability is effectively improved, and the rolling resistance is effectively reduced, in the tire 32. When the distance DU is set to be not greater than 20 mm, the recess 96 having a sufficient size is ensured on the zone between the maximum width position PW and the end 88 of the turned-up portion 86. In this case as well, the effect achieved by the recess 96 is sufficiently exhibited, and thus the bead durability is effectively improved, and the rolling resistance is effectively reduced, in the tire 32.

In the tire 32, the distance DS in the radial direction from the maximum width position PW to the outer end PS of the recess 96 is preferably not less than 10 mm and preferably not greater than 20 mm. When the distance DS is set to be not less than 10 mm, the recess 96 is located at an appropriate interval from the maximum width position PW. In the tire 32, the sidewall 38 at the maximum width position PW has an appropriate thickness, and thus good cut resistance is maintained. When the distance DS is set to be not greater than 20 mm, the recess 96 having a sufficient size is ensured on the zone between the maximum width position PW and the end 88 of the turned-up portion 86. The effect achieved by the recess 96 is sufficiently exhibited, and thus the bead durability is effectively improved, and the rolling resistance is effectively reduced, in the tire 32.

In the tire 32, a portion, of the side surface 34, radially inward of the maximum width position PW includes the above-described recess 96, an outer portion 98 extending radially outward from the outer end PS of the recess 96, and an inner portion 100 extending radially inward from the inner end PU of the recess 96.

The above-described virtual side surface VL is located between the outer portion 98 and the inner portion 100. The outer end PS of the recess 96 is the boundary between the outer portion 98 and the virtual side surface VL. The inner end PU of the recess 96 is the boundary between the inner portion 100 and the virtual side surface VL. In the tire 32, the profile of the virtual side surface VL and the profile of the outer portion 98 are tangent to each other at the boundary PS. The profile of the virtual side surface VL and the profile of the inner portion 100 are tangent to each other at the boundary PU.

In the tire 32, the recess 96 includes a bottom portion 102, an outer boundary portion 104, and an inner boundary portion 106.

The outer boundary portion 104 extends between the bottom portion 102 and the above-described outer portion 98. The profile of the outer boundary portion 104 is tangent to the profile of the outer portion 98 at the outer end PS. The outer end PS is also the boundary between the outer boundary portion 104 and the outer portion 98.

The inner boundary portion 106 extends between the bottom portion 102 and the above-described inner portion 100. The profile of the inner boundary portion 106 is tangent to the profile of the inner portion 100 at the inner end PU. The inner end PU is also the boundary between the inner boundary portion 106 and the inner portion 100.

In FIG. 2, reference character PSb represents an outer end of the bottom portion 102. Reference character PUb represents an inner end of the bottom portion 102. In the tire 32, the outer boundary portion 104 is located radially outward of the bottom portion 102. The profile of the bottom portion 102 is tangent to the profile of the outer boundary portion 104 at the outer end PSb. The outer end PSb is the boundary between the bottom portion 102 and the outer boundary portion 104. The inner boundary portion 106 is located radially inward of the bottom portion 102. The profile of the bottom portion 102 is tangent to the profile of the inner boundary portion 106 at the inner end PUb. The inner end PUb is the boundary between the bottom portion 102 and the inner boundary portion 106.

In the cross-section of the tire 32 shown in FIG. 2, the profile of the outer boundary portion 104 is represented by a circular arc that projects outward. In FIG. 2, an arrow Rs represents the radius of the circular arc that represents the profile of the outer boundary portion 104.

In the tire 32, the radius Rs of the circular arc that represents the profile of the outer boundary portion 104 is preferably not less than 40 mm. Accordingly, concentration of strain on the outer boundary portion 104 is inhibited. In the tire 32, the effect achieved by the recess 96 is sufficiently exhibited, and thus the bead durability is effectively improved, and the rolling resistance is effectively reduced. The upper limit of the radius Rs is determined as appropriate in consideration of the configuration of the profile of the side surface 34.

In the cross-section of the tire 32 shown in FIG. 2, the profile of the inner boundary portion 106 is represented by a circular arc that projects outward. In FIG. 2, an arrow Ru represents the radius of the circular arc that represents the profile of the inner boundary portion 106.

In the tire 32, the radius Ru of the circular arc that represents the profile of the inner boundary portion 106 is preferably not less than 40 mm. Accordingly, concentration of strain on the inner boundary portion 106 is inhibited. In the tire 32, the effect achieved by the recess 96 is sufficiently exhibited, and thus the bead durability is effectively improved, and the rolling resistance is effectively reduced. The upper limit of the radius Ru is determined as appropriate in consideration of the configuration of the profile of the side surface 34.

In the tire 32, from the viewpoint that the recess 96 effectively contributes to improvement of bead durability and reduction of rolling resistance, more preferably, the radius Rs of the circular arc that represents the profile of the outer boundary portion 104 is not less than 40 mm, and the radius Ru of the circular arc that represents the profile of the inner boundary portion 106 is not less than 40 mm.

In the tire 32, the profile of the bottom portion 102 is represented by a circular arc that projects inward. Thus, force applied to the bottom portion 102 is effectively distributed over the entirety of the bottom portion 102. In the tire 32, concentration of strain on a specific location of the bottom portion 102 to cause damage such as a crack is prevented. In the tire 32, the effect achieved by the recess 96 is sufficiently exhibited, and thus the bead durability is effectively improved, and the rolling resistance is effectively reduced.

In FIG. 2, an arrow Rb represents the radius of a circular arc that represents the profile of the bottom portion 102. In the tire 32, the radius Rb is determined as appropriate in consideration of the above-described distance DU in the radial direction from the end 88 of the turned-up portion 86 to the inner end PU of the recess 96, the above-described distance DS in the radial direction from the maximum width position PW to the outer end PS of the recess 96, the radius Rs of the circular arc that represents the profile of the outer boundary portion 104, and the radius Ru of the circular arc that represents the profile of the inner boundary portion 106. From the viewpoint of prevention of damage due to concentration of stress on the bottom portion 102, the radius Rb is preferably not less than 40 mm.

In FIG. 2, reference character PN represents the point of intersection of the normal line NL and the recess 96. The point of intersection PN is a position, on the recess 96, at which the thickness from the ply main body 84 to the recess 96 is the minimum thickness, that is, a minimum thickness position. Reference character PC represents the center position of the recess 96. The center position PC is specified at a position at which the length of the recess 96 measured on the cross-section shown in FIG. 2 is halved.

In the tire 32, the minimum thickness position PN of the recess 96 is located outward of the center position PC of the recess 96 in the radial direction. In the tire 32, force applied to the recess 96 is effectively distributed over the entirety of the recess 96. In the tire 32, concentration of strain on a specific location of the recess 96 to cause damage such as a crack is prevented. In the tire 32, the effect achieved by the recess 96 is sufficiently exhibited, and thus the bead durability is effectively improved, and the rolling resistance is effectively reduced. From this viewpoint, the minimum thickness position PN of the recess 96 is preferably located outward of the center position PC of the recess 96 in the radial direction.

In the tire 32, the center position PC of the recess 96 is located between the outer end 78 of the apex 66 and the outer end 76 of the chafer 42 in the radial direction. In the tire 32, the recess 96 effectively inhibits movement of the rubber at the portion radially outward of the end 88 of the turned-up portion 86. In the tire 32, the bead durability is effectively improved, and the rolling resistance is effectively reduced. From this viewpoint, the center position PC of the recess 96 is preferably located between the outer end 78 of the apex 66 and the outer end 76 of the chafer 42 in the radial direction.

In FIG. 2, a double-headed arrow HW represents the distance in the radial direction from the bead base line BBL to the maximum width position PW. A double-headed arrow HB represents the distance in the radial direction from the inner end PU of the recess 96 to the outer end PS of the recess 96.

In the tire 32, the ratio of the distance HB in the radial direction to the distance HW in the radial direction is preferably not less than 0.45 and preferably not greater than 0.65. When this ratio is set to be not less than 0.45, the size of the recess 96 is sufficiently ensured. The recess 96 effectively inhibits movement of the rubber at the portion radially outward of the end 88 of the turned-up portion 86. In the tire 32, the bead durability is effectively improved, and the rolling resistance is effectively reduced. From this viewpoint, this ratio is more preferably not less than 0.50. When this ratio is set to be not greater than 0.65, the size of the recess 96 is appropriately maintained. In the tire 32, influence of the recess 96 on stiffness is effectively inhibited. From this viewpoint, this ratio is more preferably not greater than 0.60.

Meanwhile, in the case where a nominal aspect ratio of the tire 32 is not greater than 65% and a nominal cross-sectional width of the tire 32 is not less than 385 mm, a carcass height represented as a height in the radial direction from the bead base line BBL to the point of intersection of the equator plane CL and the inner surface of the carcass 44 is low with respect to the width in the axial direction of the tread 36 in the tire 32. In the tire 32, a region in which application of a load can be absorbed by bending is narrow as compared to a normal type tire. Therefore, it is difficult to ensure sufficient bead durability in the tire 32.

As described above, in the tire 32, the recess 96 is provided on the zone of the side surface 34 between the maximum width position PW and the end 88 of the turned-up portion 86. The recess 96 contributes to bending of the tire 32. In addition, the recess 96 also inhibits movement of the rubber at the portion radially outward of the end 88 of the turned-up portion 86, and also contributes to weight reduction. Thus, even in the case where the nominal aspect ratio of the tire 32 is not greater than 65% and the nominal cross-sectional width of the tire 32 is not less than 385 mm, in the tire 32, improvement of bead durability and reduction of rolling resistance are achieved while weight reduction is achieved.

Figure 3:
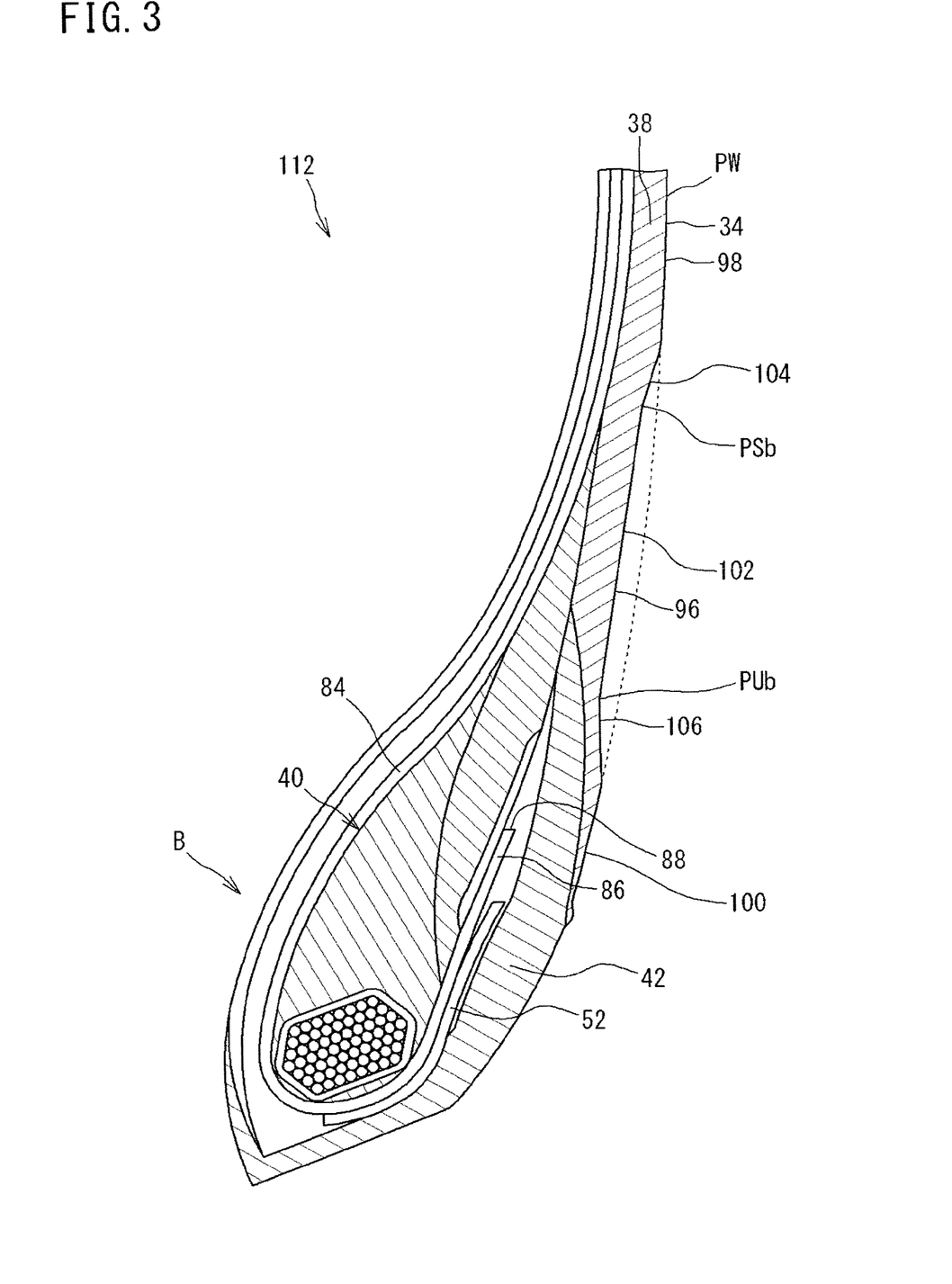
FIG. 3 is a partial cross-sectional view of a modification of a recess of the tire in FIG. 1.

FIG. 3 shows a part of a heavy duty pneumatic tire 112 (hereinafter, simply referred to as "tire 112") according to another embodiment of the present invention.

In FIG. 3, a bead portion B of the tire 112 is shown. In FIG. 3, the right-left direction is the axial direction of the tire 112, and the up-down direction is the radial direction of the tire 112. The direction perpendicular to the surface of the sheet of FIG. 3 is the circumferential direction of the tire 112.

In FIG. 3, a modification of the recess 96 provided on the side surface 34 of the tire 32 shown in FIG. 1 is shown. The tire 112 has the same structure as the tire 32 shown in FIG. 1, except for the bottom portion 102 of the recess 96. In FIG. 3, members that are the same as the members of the tire 32 shown in FIG. 1 are designated by the same reference characters, and the description thereof is omitted.

In the tire 112, the profile of the bottom portion 102 of the recess 96 is represented by a straight line, not by a circular arc. The bottom portion 102 is connected at the outer end PSb thereof to the outer boundary portion 104 of the recess 96. The bottom portion 102 is connected at the inner end PUb thereof to the inner boundary portion 106 of the recess 96.

In the tire 112 as well, similar to the tire 32 shown in FIG. 1, a short filler is used as each filler 52. The filler 52 contributes to weight reduction. In addition, the recess 96, which is provided on the zone of the side surface 34 between the maximum width position PW and the end 88 of the turned-up portion 86, inhibits movement of the rubber at the portion radially outward of the end 88 of the turned-up portion 86. Since movement of the turned-up portion 86 is inhibited, damage such as ply turn-up loose is less likely to occur in the tire 112. Furthermore, this movement inhibition also inhibits heat generation caused by deformation. In addition, the recess 96 also contributes to weight reduction. In the tire 112, improvement of bead durability and reduction of rolling resistance are achieved while weight reduction is achieved.

The profile of the bottom portion 102 of the recess 96 may be represented by a circular arc as in the tire 32, or may be represented by a straight line as in the tire 112. From the viewpoint that the effect achieved by the recess 96 is sufficiently exhibited, the profile of the bottom portion 102 of the recess 96 is preferably represented by a circular arc.

Figure 4:
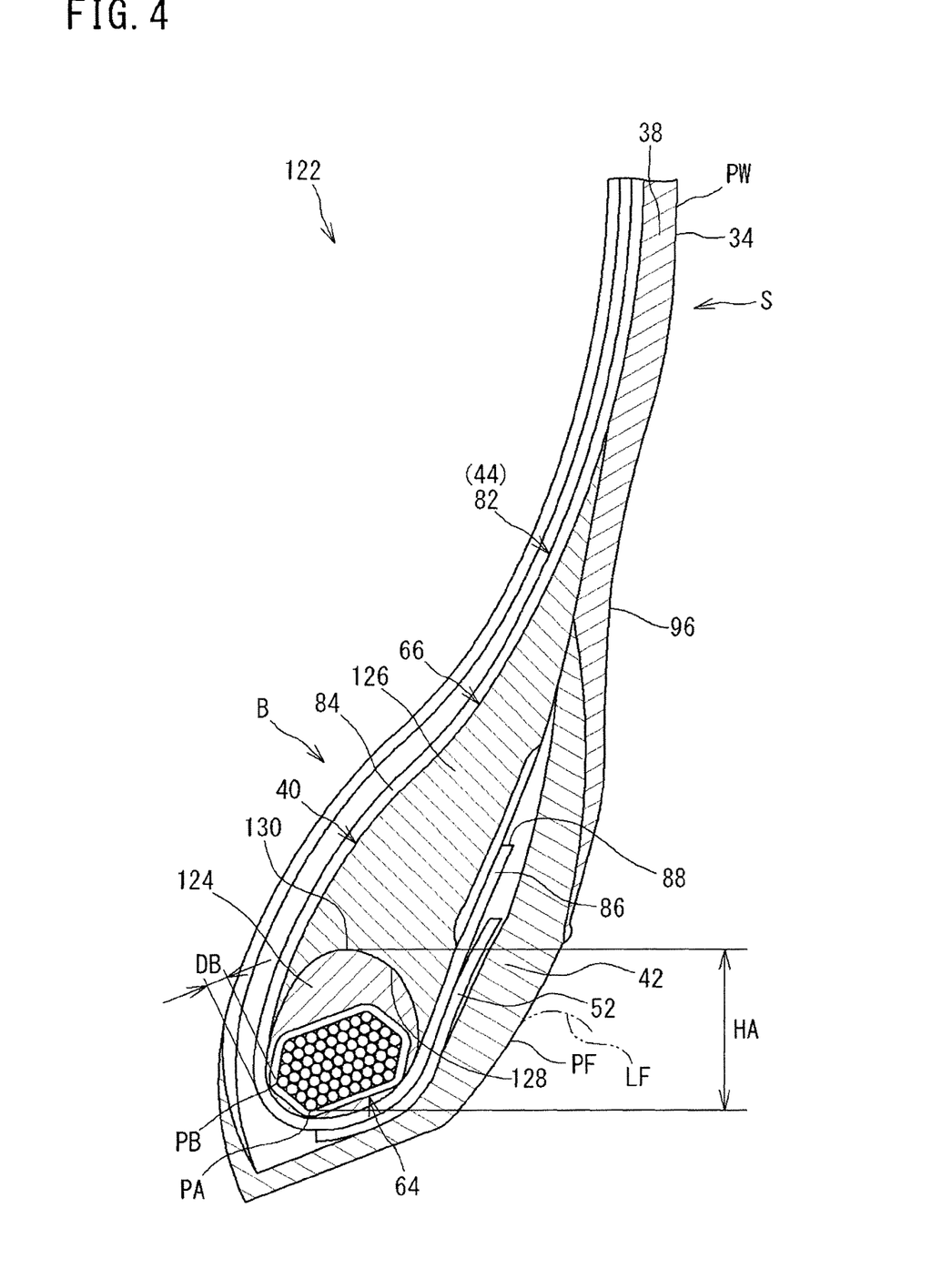
FIG. 4 is a partial cross-sectional view of a modification of a bead of the tire in FIG. 1.

FIG. 4 shows a part of a heavy duty pneumatic tire 122 (hereinafter, simply referred to as "tire 122") according to still another embodiment of the present invention.

In FIG. 4, a bead portion B of the tire 122 is shown. In FIG. 4, the right-left direction is the axial direction of the tire 122, and the up-down direction is the radial direction of the tire 122. The direction perpendicular to the surface of the sheet of FIG. 4 is the circumferential direction of the tire 122.

In FIG. 4, a modification of the apex 66 which forms a part of the bead 40 of the tire 32 shown in FIG. 1 is shown. The tire 122 has the same structure as the tire 32 shown in FIG. 1, except for the apex 66 of the bead 40. In FIG. 4, members that are the same as the members of the tire 32 shown in FIG. 1 are designated by the same reference characters, and the description thereof is omitted.

In the tire 122, the apex 66 includes a first apex 124 and a second apex 126. Similar to the first apex 70 and the second apex 72 of the tire 32 shown in FIG. 1, the first apex 124 of the tire 122 is harder than the second apex 126. The apex 66 is composed of the hard first apex 124 and the flexible second apex 126.

In the tire 122, similar to the first apex 70 of the tire 32 shown in FIG. 1, the hardness of the first apex 124 is set to be not less than 83 and not greater than 98. Similar to the second apex 72 of the tire 32 shown in FIG. 1, the hardness of the second apex 126 is set to be not less than 45 and not greater than 65.

The first apex 124 surrounds the core 64. In other words, the first apex 124 is located around the core 64. The second apex 126 is located radially outward of the first apex 124. The second apex 126 extends radially outward from the first apex 124. The second apex 126 is tapered outward in the radial direction.

As shown in FIG. 4, in the tire 122, the outer periphery of the first apex 124 has a rounded contour. The first apex 124 has a round shape. Thus, a surface of the second apex 126 that is in contact with the first apex 124, that is, a bottom surface 128 of the second apex 126, has a shape projecting radially outward in the cross-section shown in FIG. 4.

In the tire 122 as well, similar to the tire 32 shown in FIG. 1, a short filler is used as each filler 52, and the recess 96 is also provided on the zone of the side surface 34 between the maximum width position PW and the end 88 of the turned-up portion 86. The filler 52 contributes to weight reduction, and the recess 96 of the side surface 34 inhibits movement of the rubber at the portion radially outward of the end 88 of the turned-up portion 86. Since movement of the turned-up portion 86 is inhibited, damage such as ply turn-up loose is less likely to occur in the tire 122. Furthermore, this movement inhibition also inhibits heat generation caused by deformation. In addition, the recess 96 also contributes to weight reduction. In the tire 122, improvement of bead durability and reduction of rolling resistance are achieved while weight reduction is achieved.

In the tire 122, the core 64 is surrounded by the hard first apex 124 the outer periphery of which has a rounded contour. In the tire 122, falling of the bead portion B due to application of a load is inhibited, and thus good bead durability is obtained.

As shown in FIG. 4, in the tire 122, an outer end 130 of the first apex 124 is located inward of the end 88 of the turned-up portion 86 in the radial direction. In the tire 122, the height in the radial direction of the first apex 124 is, for example, lower than that of the first apex 70 of the tire 32 shown in FIG. 1.

In the tire 122, concentration of strain on the end 88 of the turned-up portion 86 is inhibited. Furthermore, in the tire 122, a region that can contribute to bending can be sufficiently ensured in a sidewall 38 portion, that is, in a side portion S, and the contour of the ply main body 84 extending along the apex 66 is easily set. In the tire 122, protrusion of the side surface 34 outward in the axial direction is inhibited, and thus an amount of strain applied to the recess 96 is reduced. In the tire 122, damage such as a crack at the recess 96 is less likely to occur. In the tire 122, the effect achieved by the recess 96 is sufficiently exhibited. Furthermore, in addition to protrusion of the side surface 34 outward in the axial direction being inhibited, the first apex 70 is formed with a small volume, and thus the rolling resistance of the tire 122 can be reduced. In the tire 122, the bead durability is effectively improved, and the rolling resistance is effectively reduced.

In FIG. 4, reference character PF represents a position, on the side surface 34, corresponding to the radially outer end of a contact surface between the tire 122 and a rim flange indicated by an alternate long and two short dashes line LF, that is, a flange contact end. In the tire 122, the outer end 130 of the first apex 124 is located outward of the flange contact end PF in the radial direction. In the tire 122, the stiffness of the first apex 124 is appropriately maintained, and protrusion of the side surface 34 at a portion outward of the flange contact end PF is effectively inhibited. In the tire 122, good bead durability is effectively maintained.

In FIG. 4, a double-headed arrow HA represents the distance in the radial direction from the radially inner end PA of the core 64 to the outer end 130 of the first apex 124. A double-headed arrow DB represents the distance from the axially inner end PB of the core 64 to the carcass ply 82. The distance DB is represented as a shortest distance.

In the tire 122, the distance HA in the radial direction from the radially inner end PA of the core 64 to the outer end 130 of the first apex 124 is preferably not less than 15 mm and preferably not greater than 45 mm. When the distance HA is set to be not less than 15 mm, the stiffness of the first apex 124 is appropriately maintained, and protrusion of the side surface 34 at the portion outward of the flange contact end PF is effectively inhibited. In the tire 122, good bead durability is effectively maintained. From this viewpoint, the distance HA is more preferably not less than 20 mm and further preferably not less than 25 mm. When the distance HA is set to be not greater than 45 mm, a region that can contribute to bending can be sufficiently ensured in the side portion S, and the contour of the ply main body 84 extending along the apex 66 is easily set, in the tire 122. In the tire 122, protrusion of the side surface 34 outward in the axial direction is inhibited, and thus an amount of strain applied to the recess 96 is reduced. In the tire 122, occurrence of damage such as a crack at the recess 96 is inhibited, and thus the effect achieved by the recess 96 is sufficiently exhibited. From this viewpoint, the distance HA is more preferably not greater than 40 mm and further preferably not greater than 35 mm.

In the tire 122, the distance DB from the axially inner end PB of the core 64 to the carcass ply 82 is preferably not less than 1 mm. When the distance DB is set to be not less than 1 mm, rubbing between the carcass ply 82 and the core 64 in a state where a load during running is applied is prevented. In the tire 122, the carcass cords near the axially inner end PB of the core 64 are effectively prevented from being cut. From this viewpoint, the distance DB is preferably not less than 1.5 mm. From the viewpoint that the first apex 124 is formed with an appropriate volume and influence of the first apex 124 on rolling resistance is inhibited, the distance DB is preferably not greater than 5 mm.

As is obvious from the above description, according to the present invention, a heavy duty pneumatic tire, in which improvement of bead durability and reduction of rolling resistance are achieved while weight reduction is achieved, is obtained.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.

Example 1

A heavy duty pneumatic tire (tire size=11R22.5) having the basic structure shown in FIG. 1 and FIG. 2 and having the specifications shown in Table 1 below was obtained. In Example 1, the ratio (TA/TB) of the minimum thickness TA from the ply main body to the recess relative to the virtual thickness TB, from the ply main body to the virtual side surface VL obtained on the assumption that the recess is not present, measured along a line segment (that is, the normal line NL) indicating the minimum thickness TA was set to 0.5.

Comparative Example 1

A tire of Comparative Example 1 is the conventional tire (tire size=11R22.5) shown in FIG. 5. In Comparative Example 1, no recess is provided on the side surface.

Example 2

A heavy duty pneumatic tire (tire size=11R22.5) having the basic structure shown in FIG. 3 and having the specifications shown in Table 1 below was obtained. In Example 2, similar to Example 1, the ratio (TA/TB) of the minimum thickness TA to the virtual thickness TB was set to 0.5.

Example 3

A heavy duty pneumatic tire (tire size=11R22.5) having the basic structure shown in FIG. 4 and having the specifications shown in Table 1 below was obtained. In Example 3, similar to Example 1, the ratio (TA/TB) of the minimum thickness TA to the virtual thickness TB was set to 0.5. Furthermore, in Example 3, the distance HA in the radial direction from the radially inner end PA of the core to the outer end of the first apex was set to 30 mm. The distance DB from the axially inner end PB of the core to the carcass ply was set to 1.5 mm.

Examples 4 to 9

Tires of Examples 4 to 9 were obtained in the same manner as Example 1, except that the ratio (TA/TB) was set as shown in Table 2 below.

[PTL Resistance]

Ply turn-up loose (PTL) resistance was evaluated as bead durability. In this evaluation, each tire was fitted onto a rim (size=22.5×8.75) and filled with air. The internal pressure of the tire was adjusted to 1000 kPa. The tire was mounted to a bench tester having a drive drum. A vertical load of 76.53 kN was applied to the tire, running with the tire was performed at 20 km/h, and the running time until damage to the bead occurred and the occurrence state of PTL were confirmed. The results are shown in Tables 1 and 2 below as indexes with the value of the tire of Example 1 being defined as 100. A higher value represents that PTL is less likely to occur and the bead durability is better.

[Rolling Resistance Coefficient (RRC)]

Each tire was fitted onto a rim (size=22.5×8.75) and filled with air. The internal pressure of the tire was adjusted to 800 kPa. The tire was mounted to a rolling resistance tester. A vertical load of 26.72 kN was applied to the tire, running with the tire was performed at 80 km/h, and the rolling resistance was measured. The results are shown in Tables 1 and 2 below as indexes with the value of Example 1 being defined as 100. A higher value represents that the rolling resistance is lower, which is preferable.

[Surface Strain]

Each tire was fitted onto a rim (size=22.5×8.75) and filled with air. The internal pressure of the tire was adjusted to 800 kPa. When a vertical load of 26.72 kN was applied to the tire to deform the tire, the length by which the tire was stretched around the center position PC of the recess provided on the side surface was measured to obtain a surface strain. The results are shown in Tables 1 and 2 below as indexes with the value of Example 1 being defined as 100. A higher value represents that the surface strain is smaller, which is preferable.

TABLE 1

|  | Comparative Example 1 | Example 1 | Example 2 | Example 3 |
|---|---|---|---|---|
| Structure | FIG. 5 | FIG. 2 | FIG. 3 | FIG. 4 |
| TA/TB [—] | — | 0.5 | 0.5 | 0.5 |
| PTL resistance | 80 | 100 | 100 | 110 |
| RRC | 80 | 100 | 100 | 110 |
| Surface strain | — | 100 | 100 | 100 |

TABLE 2

|  | Example 4 | Example 5 | Example 6 | Example 7 | Example 8 | Example 9 |
|---|---|---|---|---|---|---|
| Structure | FIG. 2 | FIG. 2 | FIG. 2 | FIG. 2 | FIG. 2 | FIG. 2 |
| TA/TB [—] | 0.2 | 0.3 | 0.4 | 0.6 | 0.7 | 0.8 |
| PTL resistance | 95 | 98 | 100 | 99 | 98 | 95 |
| RRC | 95 | 98 | 100 | 99 | 98 | 95 |
| Surface strain | 95 | 98 | 99 | 100 | 100 | 100 |

As shown in Tables 1 and 2, in the Examples, it is confirmed that, by using a short filler as the filler and also providing a recess on the side surface, improvement of bead durability and reduction of rolling resistance are achieved while weight reduction is achieved. The Examples are highly rated, as compared to the Comparative Example. From the evaluation results, advantages of the present invention are clear.

INDUSTRIAL APPLICABILITY

The above-described technology for achieving improvement of bead durability and reduction of rolling resistance while achieving weight reduction can be applied to various tires.

The invention claimed is:

1. A heavy duty pneumatic tire comprising:
   a pair of beads;
   a pair of chafers that are located axially outward of each bead and that come into contact with a rim;
   a carcass ply having a ply main body that extends on and between one bead and the other bead, and turned-up portions that are connected to the ply main body and turned around the beads from an inner side toward an outer side in an axial direction; and
   a pair of fillers that are located outward of the turned-up portions in the axial direction and that include metal cords,
   wherein
   the carcass ply includes a large number of carcass cords aligned with each other,
   all the carcass cords included in the carcass ply consist of steel,
   in a radial direction, a first end of each filler is located inward of a bead base line, and a second end of each filler is located between an end of the turned-up portion and the bead base line, all cords included in the filler are metal cords,
   a recess is provided on a zone of each side surface of the tire between a maximum tire width position and the end of the turned-up portion,
   the bead includes a core and an apex located radially outward of the core,
   an outer end of the chafer is located radially inward of an outer end of the apex,
   the apex includes a first apex and a second apex located radially outward of the first apex,
   the first apex and the second apex are provided between the ply main body and the turned-up portion,
   the first apex is harder than the second apex,
   a center position of the recess is located, in the radial direction, between the outer end of the second apex in contact with the outer end of the chafer, and the outer end of the chafer,
   a radially inner end of the recess is located radially between the end of the turned-up portion and the radially outer end of the chafer,
   the radially outer end of the recess is located radially between the outer end of the second apex and the maximum tire width position, and
   a distance in the radial direction from the end of the turned-up portion to the inner end of the recess is not less than 10 mm and not greater than 20 mm.

2. The heavy duty pneumatic tire according to claim 1, wherein a ratio of a minimum thickness from the ply main body to the recess relative to a virtual thickness, from the ply main body to a virtual side surface obtained on the assumption that the recess is not present, measured along a line segment indicating the minimum thickness is not less than 0.4 and not greater than 0.6.

3. The heavy duty pneumatic tire according to claim 2, wherein a minimum thickness position of the recess is located outward of a center position of the recess in the radial direction.

4. The heavy duty pneumatic tire according to claim 2, wherein
the recess includes a bottom portion, an outer boundary portion located outward of the bottom portion in the radial direction, and an inner boundary portion located inward of the bottom portion in the radial direction,
a profile of the outer boundary portion is represented by a circular arc that projects outward, and
a profile of the inner boundary portion is represented by a circular arc that projects outward.

5. The heavy duty pneumatic tire according to claim 2, wherein a minimum thickness position of the recess is located inward of an outer end of the apex in the radial direction.

6. The heavy duty pneumatic tire according to claim 1, wherein a distance in the radial direction from the maximum width position to an outer end of the recess is not less than 10 mm and not greater than 20 mm.

7. The heavy duty pneumatic tire according to claim 1, wherein
the recess includes a bottom portion, an outer boundary portion located outward of the bottom portion in the radial direction, and an inner boundary portion located inward of the bottom portion in the radial direction,
a profile of the outer boundary portion is represented by a circular arc that projects outward, and
a profile of the inner boundary portion is represented by a circular arc that projects outward.

8. The heavy duty pneumatic tire according to claim 7, wherein the circular arc that represents the profile of the outer boundary portion and that projects outward has a radius not less than 40 mm.

9. The heavy duty pneumatic tire according to claim 7, wherein the circular arc that represents the profile of the inner boundary portion and that projects outward has a radius not less than 40 mm.

10. The heavy duty pneumatic tire according to claim 7, wherein a profile of the bottom portion is represented by a circular arc that projects inward.

11. The heavy duty pneumatic tire according to claim 7, wherein a profile of the bottom portion is represented by a straight line.

12. The heavy duty pneumatic tire according to claim 1, wherein a ratio of a distance in the radial direction from an inner end of the recess to an outer end of the recess relative to a distance in the radial direction from the bead base line to the maximum width position is not less than 0.45 and not greater than 0.65.

13. The heavy duty pneumatic tire according to claim 1, wherein the first apex surrounds the core, and an outer periphery of the first apex has a rounded contour.

14. The heavy duty pneumatic tire according to claim 13, wherein, in the radial direction, an outer end of the first apex is located outward of a position, on the side surface, corresponding to a radially outer end of a contact surface between the tire and a flange of a rim.

15. The heavy duty pneumatic tire according to claim 13, wherein a distance in the radial direction from a radially inner end of the core to an outer end of the first apex is not less than 15 mm and not greater than 45 mm.

16. The heavy duty pneumatic tire according to claim 13, wherein a distance from an axially inner end of the core to the carcass ply is not less than 1 mm and not greater than 5 mm.

17. The heavy duty pneumatic tire according to claim 1, wherein the radially inner end of the recess is located radially inward of the outer end of the first apex.

18. The heavy duty pneumatic tire according to claim 1, comprising,
a pair of sidewalls that are located radially outward of the chafer and that covers a radially outer end of the chafer, wherein
a radially inner end of the pair of sidewalls is located radially inward of the end of the turned-up portion; and
at the inner end of the recess, the chafer is thicker than the sidewall.

19. The heavy duty pneumatic tire according to claim 1, comprising a carcass including the carcass ply, wherein the radially outer end of the second apex is located axially outward of the carcass.

20. The heavy duty pneumatic tire according to claim 1, wherein the recess extends in a circumferential direction without interruption.

* * * * *